(12) United States Patent
Mise et al.

(10) Patent No.: US 8,027,581 B2
(45) Date of Patent: Sep. 27, 2011

(54) IMAGING APPARATUS, IMAGING APPARATUS CONTROL METHOD, AND COMPUTER PROGRAM

(75) Inventors: Tetsuo Mise, Tokyo (JP); Hiroyuki Nemoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 206 days.

(21) Appl. No.: 12/334,715

(22) Filed: Dec. 15, 2008

(65) Prior Publication Data

US 2009/0190909 A1 Jul. 30, 2009

(30) Foreign Application Priority Data

Jan. 25, 2008 (JP) ................................ 2008-014454

(51) Int. Cl.
*G03B 17/00* (2006.01)
*H04N 5/232* (2006.01)

(52) U.S. Cl. .......................................... 396/81; 348/347

(58) Field of Classification Search .................... 396/76, 396/79, 80, 81, 85, 91, 93, 133; 348/347, 348/349

See application file for complete search history.

(56) References Cited

U.S. PATENT DOCUMENTS

| 2004/0057711 A1* | 3/2004 | Ogg et al. ........................ 396/81 |
| 2006/0044456 A1 | 3/2006 | Ohta |
| 2007/0285528 A1 | 12/2007 | Mise et al. |
| 2007/0286589 A1 | 12/2007 | Ishiwata et al. |
| 2008/0013851 A1 | 1/2008 | Ishiwata et al. |

FOREIGN PATENT DOCUMENTS

| JP | 11-231206 | 8/1999 |
| JP | 2001-57644 | 2/2001 |
| JP | 2001-166200 | 6/2001 |
| JP | 2003-57528 | 2/2003 |
| JP | 2004-53722 | 2/2004 |
| JP | 2004-294570 | 10/2004 |
| JP | 2005-121752 | 5/2005 |
| JP | 2005-331724 | 12/2005 |
| JP | 2006-64842 | 3/2006 |
| JP | 2006-162821 | 6/2006 |
| JP | 2006-349744 | 12/2006 |
| JP | 2007-178577 | 7/2007 |
| JP | 2007-219060 | 8/2007 |

OTHER PUBLICATIONS

U.S. Appl. No. 12/358,917, filed Jan. 23, 2009, Mise, et al.
U.S. Appl. No. 13/025,226, filed Feb. 11, 2011, Mise, et al.

* cited by examiner

*Primary Examiner* — W. B. Perkey
*Assistant Examiner* — Minh Phan
(74) *Attorney, Agent, or Firm* — Oblon, Spivak, McClelland, Maier & Neustadt, L.L.P.

(57) ABSTRACT

An imaging apparatus includes: a control unit configured to detect a focus position by moving a focusing lens before and after a preset position which is a focusing lens position set by a focus preset function, with the control unit setting a scan range which is a movement range of the focusing lens to a different range according to a setting state of a zoom lens, obtaining an AF evaluation value along with movement of the focusing lens within the set scan range, and determining a focus position based on the obtained AF evaluation value.

16 Claims, 11 Drawing Sheets

IMAGING APPARATUS, IMAGING APPARATUS CONTROL METHOD, AND COMPUTER PROGRAM

CROSS REFERENCES TO RELATED APPLICATIONS

The present invention contains subject matter related to Japanese Patent Application JP 2008-014454 filed in the Japanese Patent Office on Jan. 25, 2008, the entire contents of which are incorporated herein by reference.

BACKGROUND OF THE INVENTION

1. Field of the Invention

The present invention relates to an imaging apparatus, imaging apparatus control method, and computer program. More particularly, the present invention relates to an imaging apparatus, imaging apparatus control method, and computer program, which perform focus control.

2. Description of the Related Art

With a great number of current imaging apparatuses such as still cameras, video cameras, and so forth, an auto-focus (AF) mechanism is implemented, which automatically focuses on a subject. For example, with focus control based on contrast measurement employed for many cameras, a focus position is determined by determining whether the contrast of imaged data obtained through a lens is high or low. That is to say, a position where the contrast intensity of an image becomes the maximum is detected while moving a focusing lens, and this position is regarded as a focus position. Note that a range where the focusing lens is moved is referred to as a scan range, and lens driving is typically performed with a range between the near side and the infinity side as a scan range.

Further, a great number of cameras are employed, which have a focus preset function whereby shooting can be performed by rapidly moving a lens to a focus preset position set by a photographer beforehand. For example, with Japanese Unexamined Patent Application Publication No. 2004-294570, and Japanese Unexamined Patent Application Publication No. 2006-64842, a camera having the focus preset function is described. Also, with Japanese Unexamined Patent Application Publication No. 2004-53722, a camera has been disclosed wherein subject distances which a user intends to shoot can be preset by being assigned to multiple buttons.

Employing the focus preset function enables shooting to be started by rapidly moving a lens to a predetermined position, and accordingly, the shooting start timing can be sped up as compared to the case of employing the auto-focus (AF) function.

With shooting employing auto-focus (AF), lens driving is performed with a range between the near side and the infinity side as a scan range, which results in a problem that it takes time to determine a focus position. Also, for example, in a case wherein there is a wire net in front, an animal exists on the other side thereof, and shooting of the animal is attempted, there is a possibility that a contrast peak will be detected in both of the wire net and animal with auto-focus processing, and a photo focused on the wire net is shot, which is not what the user intended.

With Japanese Unexamined Patent Application Publication No. 2006-349744, there has been proposed a method for restricting a scan range of AF to separate multiple subjects as an arrangement for solving such a problem. However, in the case of employing this method, there is a possibility that separation of multiple far and near subjects is not performed well at a zoom position (focal distance) of which the depth of field is deep, such as the wide angle side, and shooting is executed while focusing on a subject other than a target subject. Note that "depth of field" is an in-focus range available before and after one focus position (point of focus), and a state wherein this range is wide is referred to that the depth of field is deep. In general, the depth of field is deep in a case wherein the optical zoom is at the wide angle side, and the depth of field is shallow at the telescopic side.

SUMMARY OF THE INVENTION

It has been found desirable to provide an imaging apparatus, imaging apparatus control method, and computer program which realize precise focus processing (focusing) as to a target subject for a short time.

According to an embodiment of the present invention, an imaging apparatus includes: a control unit configured to detect a focus position by moving a focusing lens before and after a preset position which is a focusing lens position set by a focus preset function, with the control unit setting a scan range which is a movement range of the focusing lens to a different range according to a setting state of a zoom lens, obtaining an AF evaluation value along with movement of the focusing lens within the set scan range, and determining a focus position based on the obtained AF evaluation value.

The control unit may determine whether a zoom lens position is at the wide angle side or telescopic side sectioned by a predetermined boundary position, and performs processing for setting an AF evaluation value peak detection section to which a different method is applied depending on whether the zoom lens position is at the wide angle side or telescopic side.

In a case in which the zoom lens position is at the telescopic side, the control unit may set an additional value of the following two values $D1$=(distance between a cam curve where the preset position is set and the adjacent cam curve)$\times(\frac{1}{2})$, and $D2$=(setting distance in consideration of attitude difference), i.e., $D1+D2$ before and after the preset position Xm to set an AF evaluation value peak detection section, and in a case in which the zoom lens position is at the wide angle side, the control unit sets $D2$=(setting distance in consideration of attitude difference) before and after the preset position Xm to set an AF evaluation value peak detection section.

The $D2$=(setting distance in consideration of attitude difference) may be distance within a range of ($\frac{1}{4}$ through 1)$\times$(depth of field).

The control unit may set D which is a greater value of the following two values $D1$=(distance between a cam curve where the preset position is set and the adjacent cam curve)$\times(\frac{1}{2})$, and $D2$=(setting distance in consideration of attitude difference), i.e., $D=MAX(D1, D2)$ before and after the preset position Xm to set an AF evaluation value peak section.

The control unit may execute processing for setting a range including infeed amount set beforehand in the AF evaluation value peak detection section as a scan range which is a movement range of the focusing lens.

The control unit may calculate the AF evaluation value based on contrast within a detection frame set within an image obtained by the imaging apparatus.

According to an embodiment of the present invention, an imaging apparatus control method executed by an imaging apparatus includes the step of: focus controlling arranged to cause a control unit to detect a focus position by moving a focusing lens before and after a preset position which is a focusing lens position set by a focus preset function, with the focus controlling including a step of setting a scan range which is a movement range of the focusing lens to a different range according to a setting state of a zoom lens, obtaining an AF evaluation value along with movement of the focusing lens within the set scan range, and determining a focus position based on the obtained AF evaluation value.

The focus controlling may includes the steps of: determining whether a zoom lens position is at the wide angle side or telescopic side sectioned by a predetermined boundary position, and setting an AF evaluation value peak detection section to which a different method is applied depending on whether the zoom lens position is at the wide angle side or telescopic side.

In a case in which the zoom lens position is at the telescopic side, in the focus controlling there may be set an additional value of the following two values $D1$=(distance between a cam curve where the preset position is set and the adjacent cam curve)×(½), and $D2$=(setting distance in consideration of attitude difference), i.e., $D1+D2$ before and after the preset position Xm to set an AF evaluation value peak detection section, and in a case in which the zoom lens position is at the wide angle side, in the focus controlling there may be set $D2$=(setting distance in consideration of attitude difference) before and after the preset position Xm to set an AF evaluation value peak detection section.

The $D2$=(setting distance in consideration of attitude difference) may be distance within a range of (¼ through 1)× (depth of field).

The focus controlling may include a step of: setting D which is a greater value of the following two values $D1$=(distance between a cam curve where the preset position is set and the adjacent cam curve)×(½), and $D2$=(setting distance in consideration of attitude difference), i.e., $D=MAX(D1, D2)$ before and after the preset position Xm to set an AF evaluation value peak section.

The focus controlling may include a step of: executing processing for setting a range including infeed amount set beforehand in the AF evaluation value peak detection section as a scan range which is a movement range of the focusing lens.

The focus controlling may include a step of: calculating the AF evaluation value based on contrast within a detection frame set within an image obtained by the imaging apparatus.

According to an embodiment of the present invention, a computer program causing an imaging apparatus to execute focus control, the program including a step of: focus controlling arranged to cause a control unit to detect a focus position by moving a focusing lens before and after a preset position which is a focusing lens position set by a focus preset function, with the focus controlling including a step of setting a scan range which is a movement range of the focusing lens to a different range according to a setting state of a zoom lens, obtaining an AF evaluation value along with movement of the focusing lens within the set scan range, and determining a focus position based on the obtained AF evaluation value.

Note that the computer program according to an embodiment of the present invention is, for example, a computer program which can be provided with a storage medium or communication medium which is provided in a computer-readable format as to a general-purpose computer system which can execute various program codes. Such a program is provided in a computer-readable format, whereby processing corresponding to the program can be realized on a computer system.

Further objects, features, and advantages of the present invention will become apparent from the later-described embodiments of the present invention and the attached drawings. Note that system as used in the present specification is a logical group configuration of multiple devices, and is not restricted to each component device being within the same housing.

With the arrangement of an embodiment of the present invention, when setting a scan range which is a movement range of a focusing lens before and after the preset position of the focusing lens set by the focus preset function, a different scan range is set according to the setting state of a zoom lens, and a focus position is determined by obtaining an AF evaluation value within the set scan range. For example, an arrangement is made wherein determination is made whether the zoom lens is positioned in either the wide angle side or telescopic side, and a different scan range is set depending on whether the zoom lens is in the wide angle range or telescopic side, thereby setting a focus position. According to the present arrangement, the most appropriate scan section according to a zoom position can be set, and accordingly, precise high-speed focus setting as to a target subject can be performed.

DESCRIPTION OF THE PREFERRED EMBODIMENTS

Description will be made regarding the details of an imaging apparatus, imaging apparatus control method, and computer program, according to an embodiment of the present invention, with reference to the drawings.

Figure 1A:
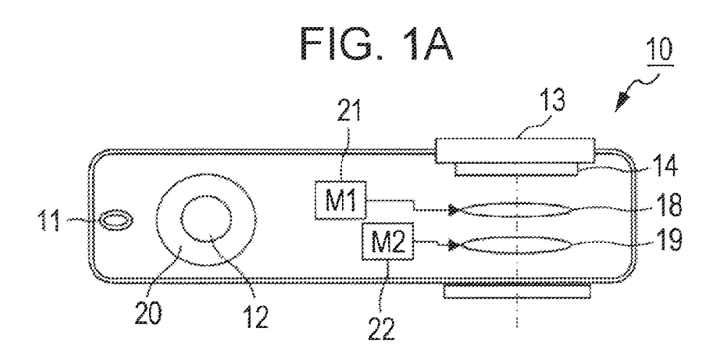
FIGS. 1A through 1C are diagrams describing an external configuration example of an imaging apparatus according to an embodiment of the present invention.
Figure 1B:
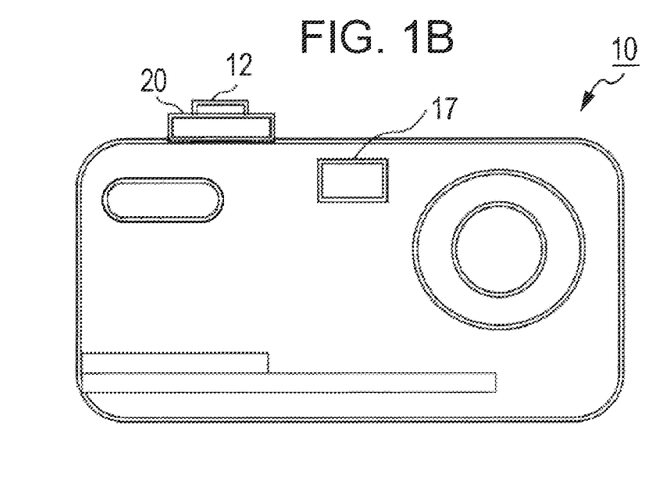
Figure 1C:
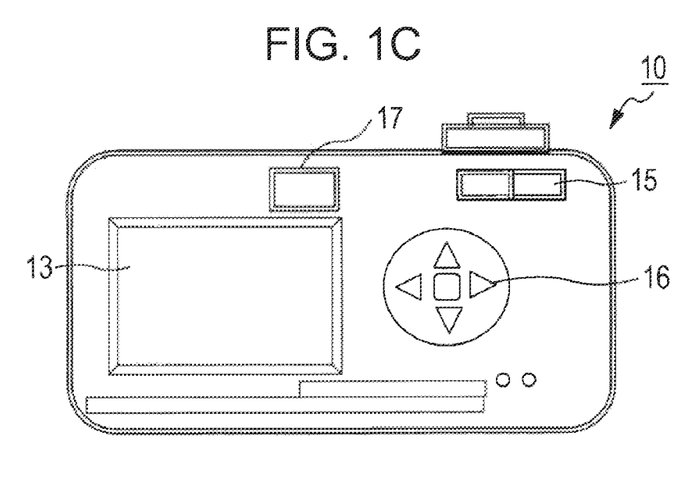
Figure 2:
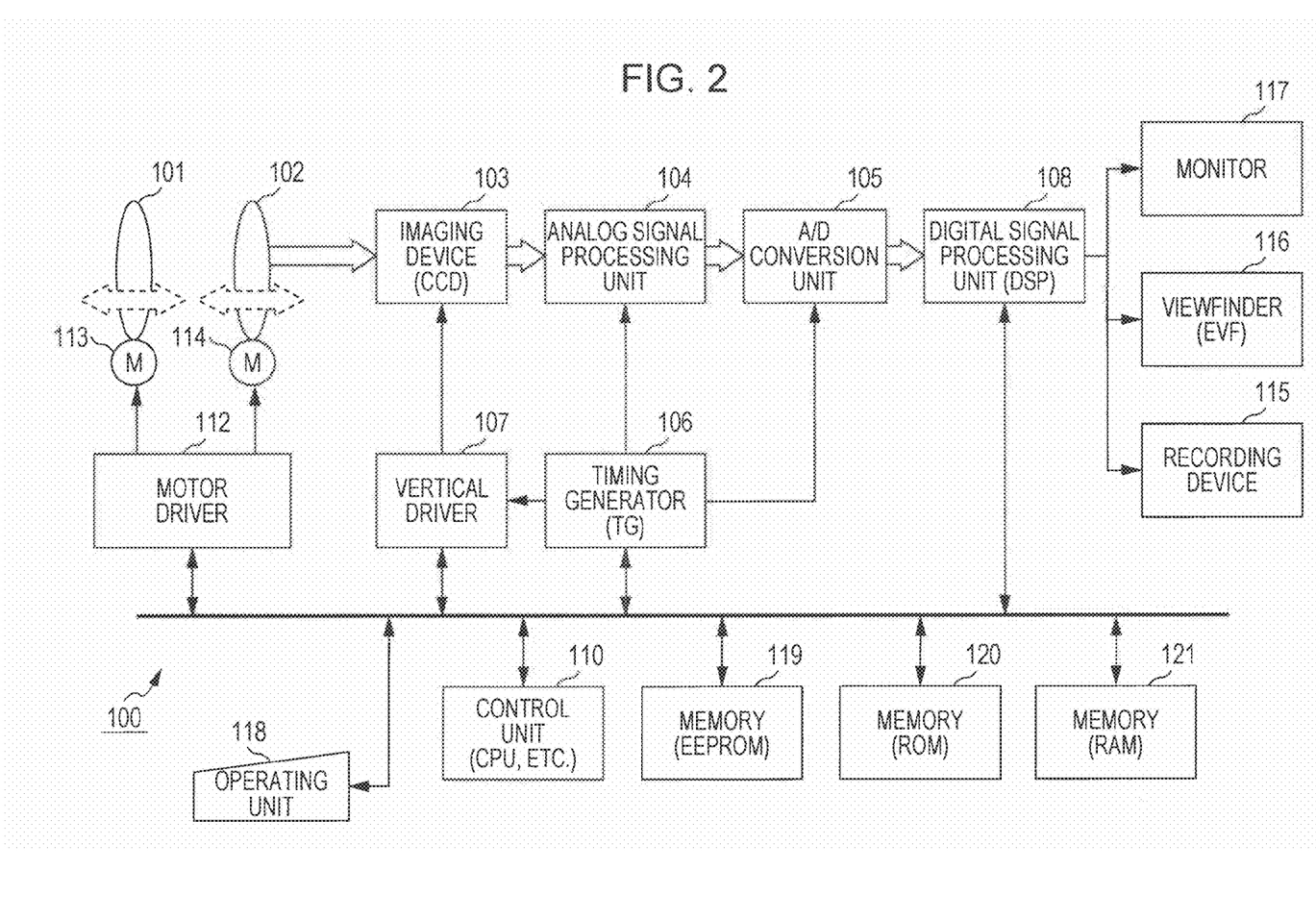
FIG. 2 is a diagram describing a hardware configuration example of the imaging apparatus according to an embodiment of the present invention.

First, description will be made regarding a configuration example of an imaging apparatus according to an embodiment of the present invention, with reference to FIGS. 1A through 2. FIGS. 1A through 1C are diagrams illustrating the external view of an imaging apparatus 10 according to an embodiment of the present invention. FIG. 1A shows a top view of the imaging apparatus 10, FIG. 1B shows a front view, and FIG. 1C shows a rear view. A lens portion of the top view in FIG. 1A is illustrated as a cross-sectional view. The imaging apparatus 10 includes a power supply switch 11, release switch 12 serving as trigger for setting image capturing timing, i.e., a shutter, monitor 13 for displaying an image (through image) shot by the image apparatus, operating information, or the like, imager 14 serving as an imaging device (CCD), zoom button 15 for performing zoom control, operating buttons 16 for inputting various types of operating information, viewfinder 17 for confirming an image (through image) shot by the imaging apparatus, focusing lens 18 driven with focus adjustment, zoom lens 19 driven at the time of zoom adjustment, mode dial 20 for setting a shooting mode, focusing lens motor (M1) 21 for driving the focusing lens 18, and a zoom lens motor (M2) 22 for driving the zoom lens 19.

A subject image is displayed on the viewfinder 17 and monitor 13. The viewfinder 17 and monitor 13 are configured of, for example, an LCD, and a subject image through the lens is projected as a moving image. This moving image is called a through image. A user looks at the viewfinder 17 or monitor 13, confirms a target subject to be shot, and presses the release switch 12 serving as a shutter switch, thereby executing recording processing of the image.

Description will be made regarding the internal configuration of an imaging apparatus 100 according to an embodiment of the present invention, with reference to FIG. 2. The imaging apparatus according to an embodiment of the present invention is an imaging apparatus having an auto-focus function. Incident light through a focusing lens 101 and zoom lens 102 is input to an imaging device 103, and is photoelectric-converted at the imaging device 103. The photoelectric-converted data is input to an analog signal processing unit 104, and is subjected to processing such as noise rejection or the like at the analog signal processing unit 104, and is converted into a digital signal at an A/D conversion unit 105. The data digital-converted at the A/D conversion unit 105 is recorded in a recording device 115 made up of, for example, flash memory or the like. Further, this data is displayed on a monitor 117 and viewfinder (EVF) 116. An image through the lens is displayed on the monitor 117 and viewfinder (EVF) 116 as a through image regardless of whether or not shooting is performed.

An operating unit 118 is an operating unit including a release switch 12 and zoom button 15 provided on the camera unit described with reference to FIGS. 1A through 1C, operating buttons 16 for inputting various types of operating information, mode dial 20 for setting a shooting mode, and so forth. A control unit 110 includes a CPU, and executes control of various types of processing executed by the imaging apparatus in accordance with a program stored in memory (ROM) 120 or the like. Memory (EEPROM) 119 is nonvolatile memory, where image data, various types of supplemental information, program, and so forth are stored. The memory (ROM) 120 stores a program, computation parameters, and so forth employed by the control unit (CPU) 110. Memory (RAM) 121 stores the program employed by the control unit (CPU) 110, parameters that change with the execution thereof as appropriate, and so forth.

A motor driver 112 drives a focusing lens driving motor 113 set so as to correspond to the focusing lens 101, and a zoom lens driving motor 114 set so as to correspond to the zoom lens 102. A vertical driver 107 drives the imaging device (CCD) 103. A timing generator 106 generates a processing timing control signal for the imaging device 103 and analog signal processing unit 104, and controls the processing timing of each of these processing units.

Figure 3:
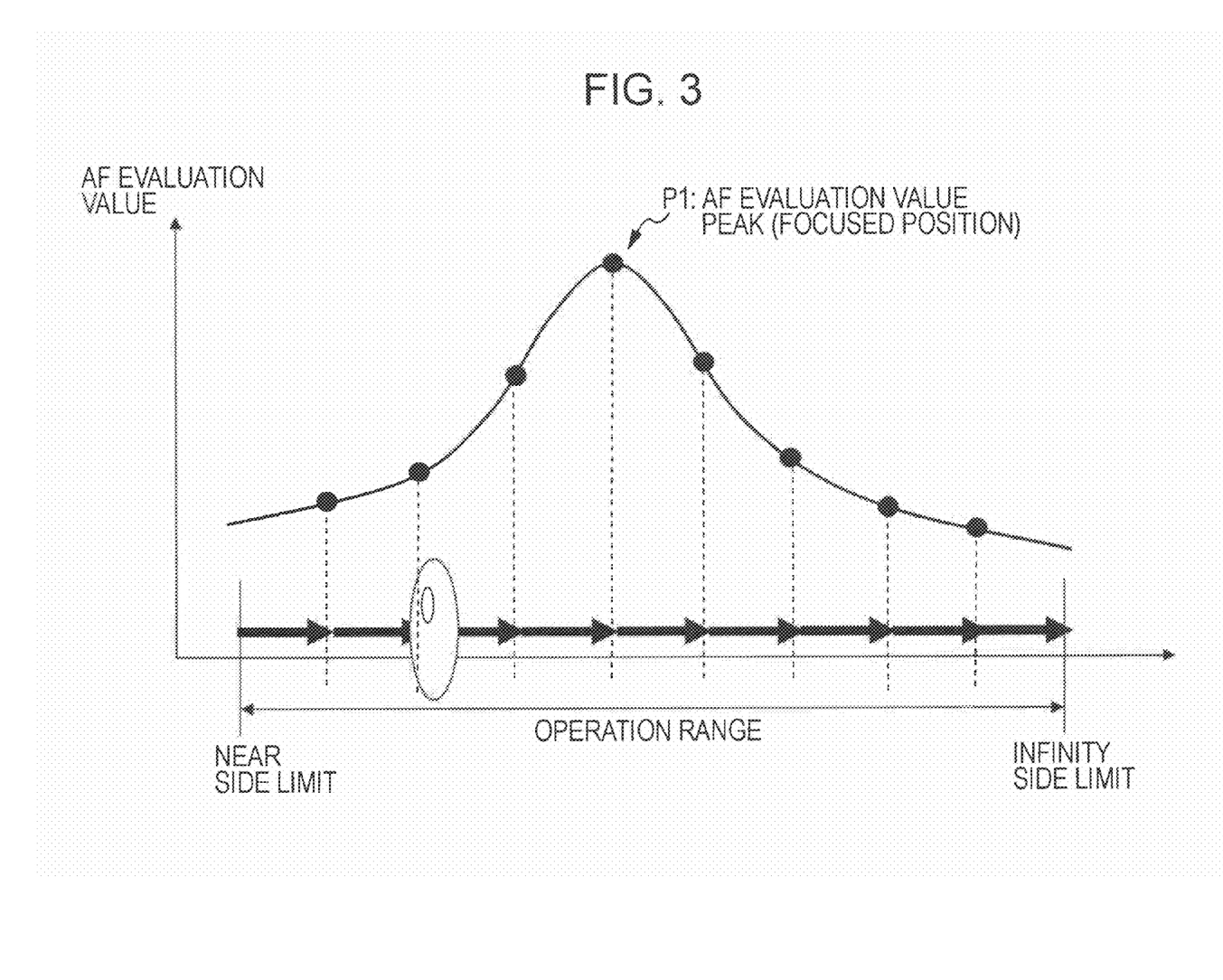
FIG. 3 is a diagram describing a lens driving and AF evaluation value obtaining processing example executed as focusing operation with focus control.

Next, description will be made regarding auto-focus processing based on contrast measurement as an example of auto-focus (AF) control processing executed by the imaging apparatus according to an embodiment of the present invention, with reference to FIG. 3. The focus control based on contrast measurement is a technique for determining a focus position by determining whether the contrast of imaged data obtained through the lens is high or low.

The focus control is performed by employing the contrast magnitude information of an image obtained at a video camera or still camera. For example, a particular region of an imaged image is set as a signal acquisition region for focus control (spatial-frequency extraction area) This region is referred to as a detection frame (distance-measuring frame). For example, processing is performed wherein multiple small regions of a shot image are set as detection frames. Determination is made that the higher the contrast of a detection frame region is, the more this region is in focus, or the lower the contrast is, the more this region is out of focus, and accordingly, a focus position is discriminated by driving the lens to a position which makes contrast higher.

Specifically, a method is employed wherein high-frequency components of a detection frame which is a particular region are extracted, integral data of the extracted high-frequency components is generated, and the height of contrast is determined based on the generated high-frequency component integral data. That is to say, multiple images are obtained while moving the focusing lens to multiple positions, and the luminance signal of each image is subjected to filter processing represented by a high-pass filter, thereby obtaining an AF evaluation value indicating the contrast intensity of each image. At this time, in a case wherein there is a subject focused on a certain focus position, an AV evaluation value as to a focusing lens position draws a curve such as shown in FIG. 3. A peak position P1 of this curve, i.e., a position where the contrast value of an image is the maximum is a focus position. According to this method, focusing operation can be performed based on only the information of an image projected on an imager which is an imaging device of a digital camera, and there does not have not to be provided a distance-measuring optical system other than an imaging optical system, and accordingly, this method is widely employed with digital cameras.

However, employing an auto-focus function wherein lens driving is performed with a range of the near side through infinity side as a scan range results in a problem wherein it takes time to determine a focus position. With the imaging apparatus according to an embodiment of the present invention, an AF evaluation value is obtained by moving the focusing lens within a limited range including a focus preset position set by a photographer beforehand. Detection of the peak position of an AF evaluation value is performed within this limited short scan section, thereby realizing detection of a high-speed precise focal point, i.e., detection of a focus position.

As described with reference to FIGS. 1A through 2, though the imaging apparatus includes the zoom lens which moves by zoom control, and focusing lens which moves at the time of focus control, there is a correspondence relation between the focus position of the focusing lens as to the position of the zoom lens. This correspondence relation will be described with reference to FIG. 4.

Figure 4:
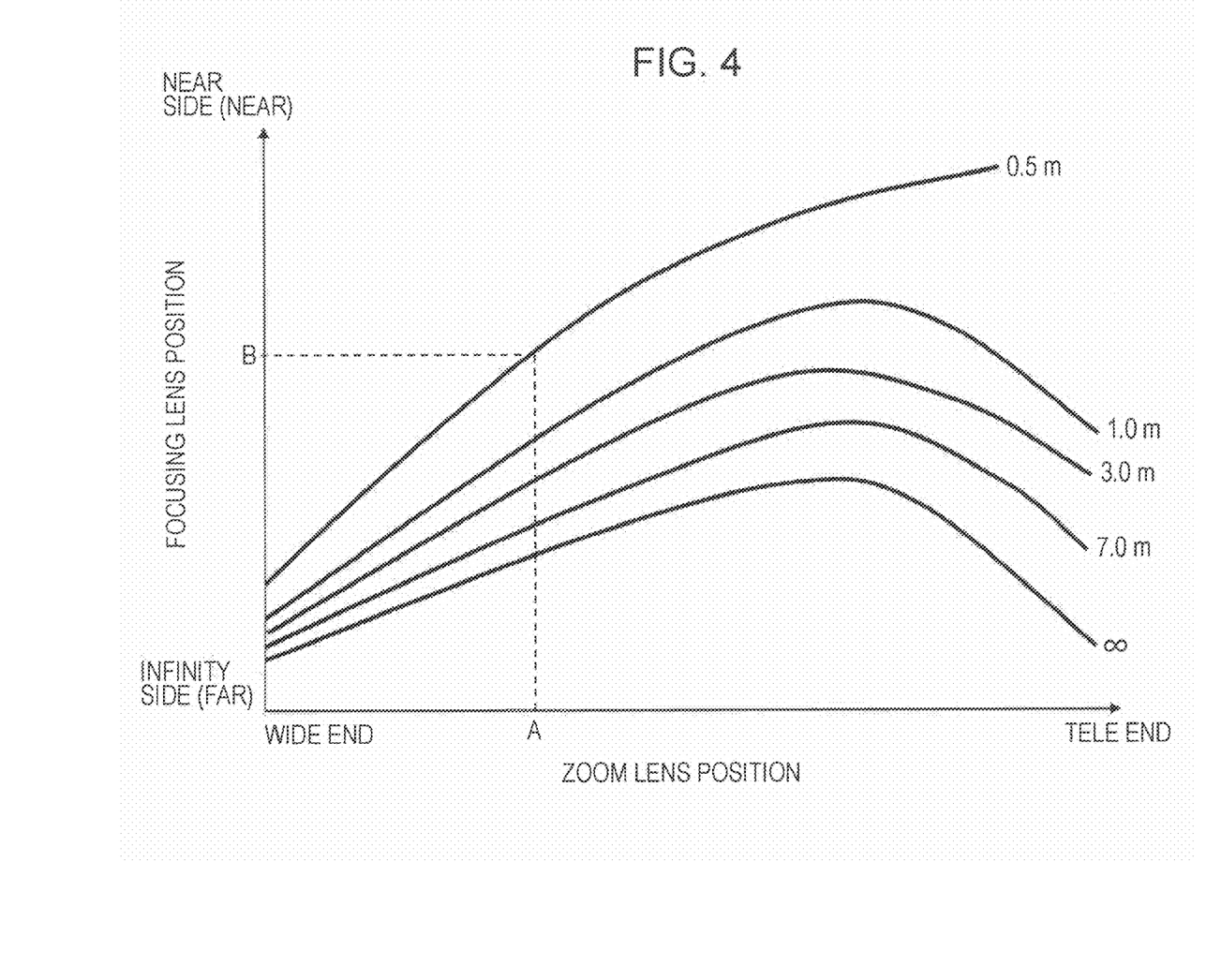
FIG. 4 is a diagram describing a cam curve illustrating correlation between a zoom lens position and a focusing lens position in focus.

FIG. 4 is a diagram illustrating the track of a focusing lens position serving as a focal point wherein focusing is realized for each of multiple different subject distances (0.5 m, 1.0 m, 3.0 m, 7.0 m, and ∞) with the horizontal axis as a zoom lens position (wide end through tele end), and with the vertical axis as a focusing lens position (infinity side through near side). The curves drawn in this graph are referred to as cam curves.

For example, in a case wherein the user employs the focus preset function to set the distance to a subject, and operates the zoom lens, the user moves the focusing lens along this curve (cam curve), whereby the focusing lens can be set to a focus position.

Figure 5:
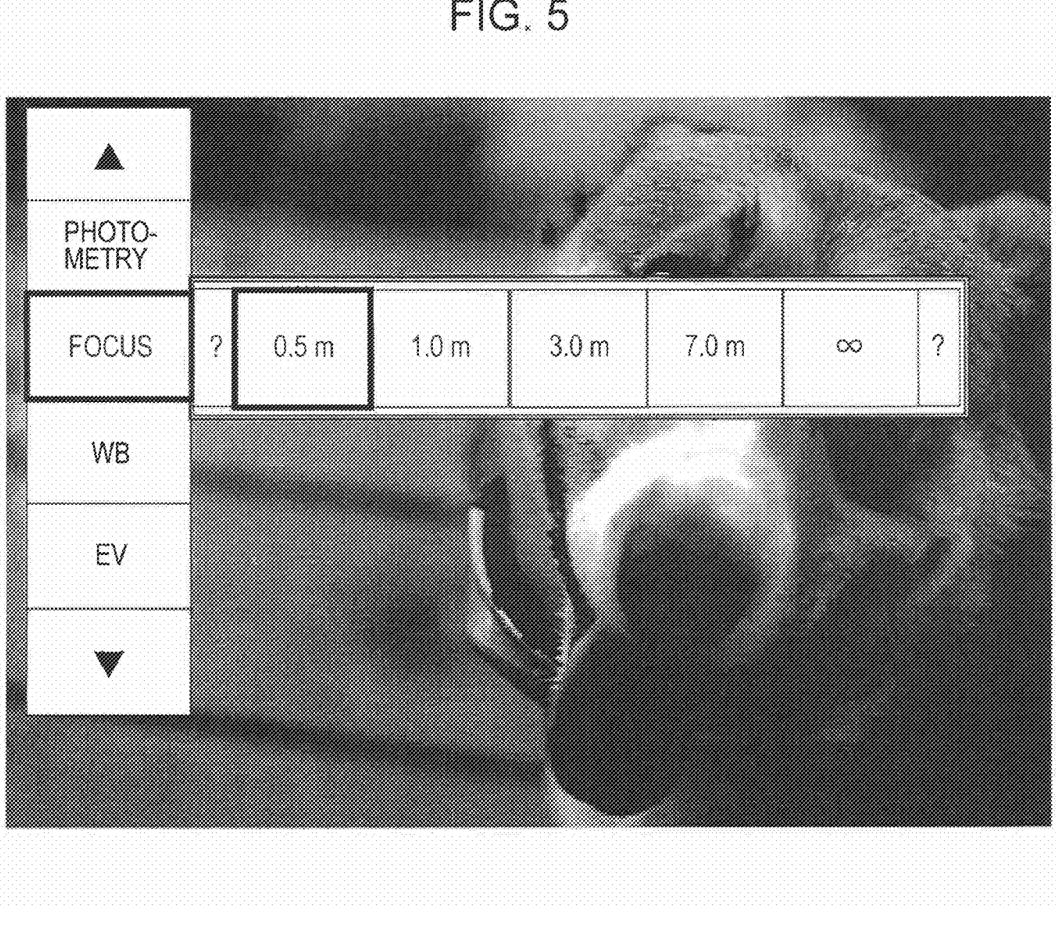
FIG. 5 is a diagram describing an operating screen example displayed on a monitor of the imaging apparatus in the case of employing a focus preset function.

In the case of employing the focus preset function, an operating screen such as shown in FIG. 5 is displayed on the monitor of the imaging apparatus. As shown in FIG. 5, 0.5 m, 1.0 m, 3.0 m, 7.0 m, and ∞ are displayed as selectable candidates as a subject distance, and the user can select a distance to a subject from these distance candidates. The user can further operate the zoom lens by zoom control.

For example, in a case wherein the user selects distance of 0.5 m as a subject distance to perform zoom control, when setting a focus lens position in accordance with the curve (0.5 m) shown in FIG. 4, an image focusing on the subject distance (0.5 m) set by the user can be shot. For example, when setting a zoom lens position to a position A shown in FIG. 4, a focus lens position is set to B. This position is a focus position when disposing a subject in a position of 0.5 m. In a case wherein the user selects distance of 1.0 m as a subject distance to perform zoom control, a focus lens position is determined in accordance with the curve (1.0 m) shown in FIG. 4.

Employing this cam curve allows the user to shoot an in-focus image if the subject distance estimated by the user is correct. However, there is difference with the actual distance, and also as shown in FIG. 5, selectable candidates as a subject distance are restricted to 0.5 m, 1.0 m, 3.0 m, 7.0 m, and ∞, and accordingly, shooting with a precise focal point may not be performed.

With the imaging apparatus according to an embodiment of the present invention, a restrictive AF evaluation peak detection section is set before and after a range including the focus preset position set by the user, and the focusing lens is moved within the restrictive range including the AF evaluation value peak detection section to detect the peak of an AF evaluation value, thereby determining a precise focus position, i.e., a focusing lens setting position.

Description will be made regarding an AF scan range corresponding to the setting processing of this AF evaluation peak detection section, and the movement range of the focusing lens, with reference to FIGS. 6 and 7. With the imaging apparatus according to an embodiment of the present invention, a different AF evaluation peak detection section is set according to a zoom state, i.e., the settings of the zoom lens.

Figure 6:
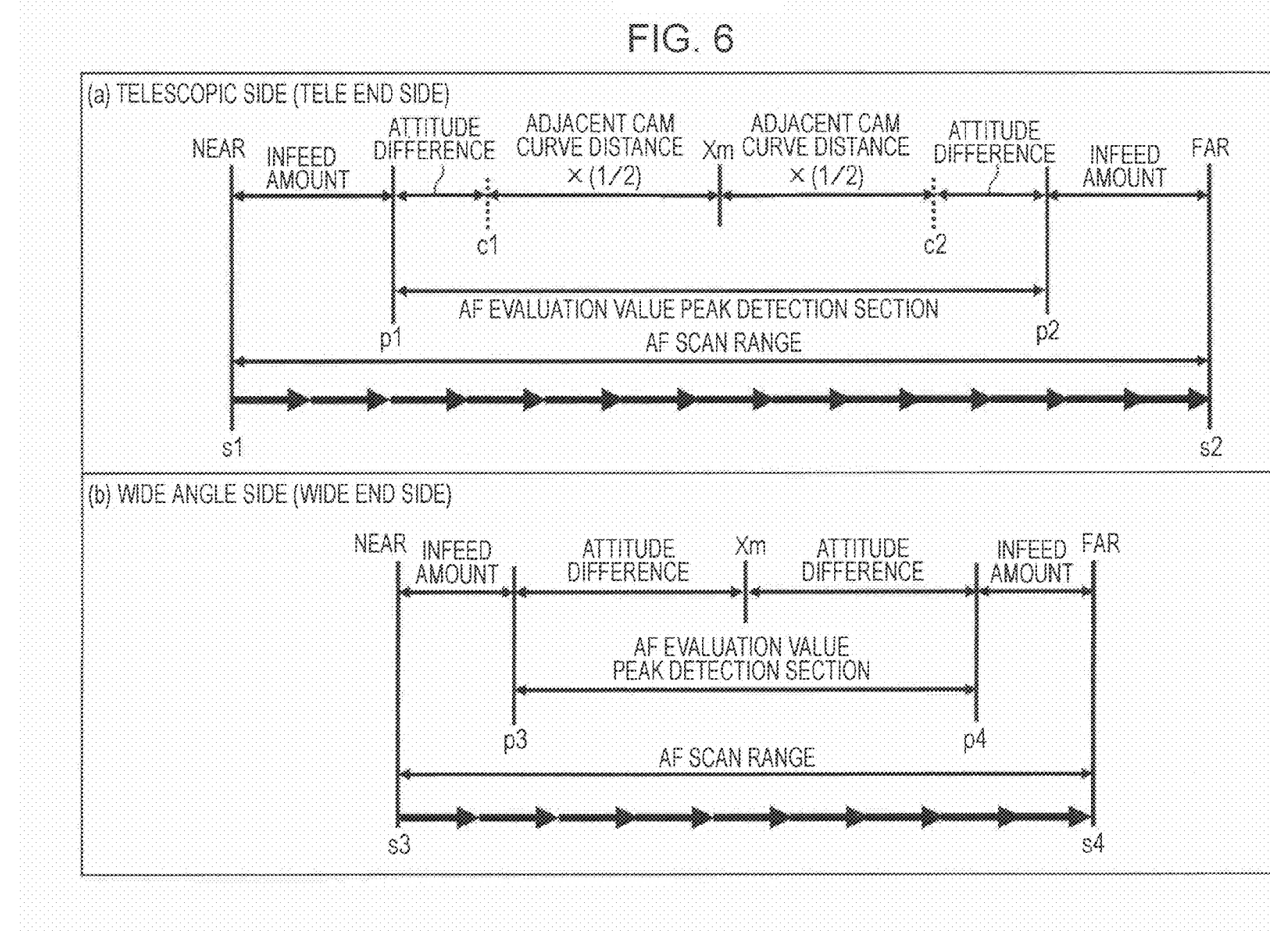
FIG. 6 is a diagram describing a processing example for setting an AF evaluation value peak detection section, and an AF scan range corresponding to a movement range of a focusing lens, according to an embodiment of the present invention.

Specifically, for example, as shown in FIG. 6, by sectioning the setting position of the zoom lens into the following two types, i.e., (a) telescopic side (tele end side), and
(b) wide angle side (wide end side), a different AF evaluation peak detection section is set according to each state.

Figure 7:
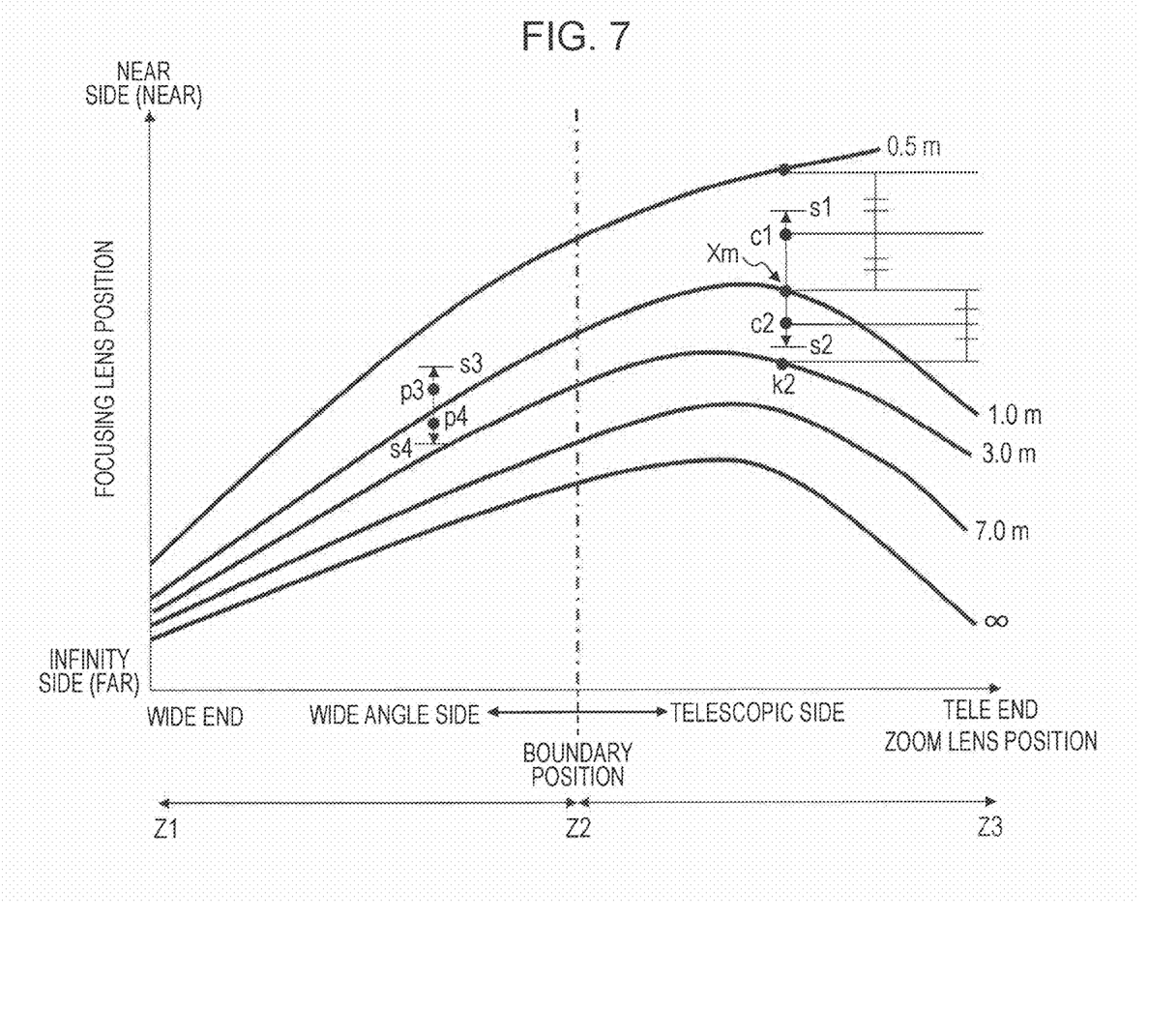
FIG. 7 is a diagram describing a processing example for setting an AF evaluation value peak detection section, and an AF scan range corresponding to a movement range of a focusing lens, according to an embodiment of the present invention.

The (a) telescopic side (tele end side) and the (b) wide angle side (wide end side) are sectioned by a zoom lens position such as shown in FIG. 7. The setting position of the zoom lens is divided into two by a predetermined boundary position (Z2), and in a case wherein the zoom lens is set to a position Z1 through Z2 shown in FIG. 7, the (b) wide angle side (wide end side) is set as an AF evaluation value peak detection section, and in a case wherein the zoom lens is set to a position Z2 through Z3 shown in FIG. 7, the (a) telescopic side (tele end side) is set as an AF evaluation value peak detection section. The boundary position (Z2) is set an appropriate value according to the imaging apparatus, for example, such as a zoom lens position of magnification=three times.

Now, returning to FIG. 6, and a setting processing example of an AF evaluation value peak detection section will be described. The center position (Xm) shown in each of the (a) telescopic side (tele end side), and the (b) wide angle side (wide end side) is a focusing lens position set by the focus preset function. That is to say, the center position (Xm) is a focusing lens position set as a result of the user estimating distance to a subject, and performing distance selection based on the setting screen described with reference to FIG. 5.

This focusing lens position (Xm) is a position on the curves (cam curves) shown in FIG. 4. That is to say, as described previously with reference to FIG. 4, the focusing lens position (Xm) is a focusing lens position determined according to the subject distance selected by the user, and a zoom lens position by zoom control operated by the user.

With the imaging apparatus according to an embodiment of the present invention, an AF evaluation value peak detection section (p1 through p2) is set before and after this focusing lens preset position (Xm) serving as the center. As shown in FIG. 6, with the (a) telescopic side (tele end side), an additional value of the following two values D1=(distance between a cam curve where the preset position Xm is set and the adjacent cam curve)×(½), and D2=(setting distance in consideration of attitude difference), i.e., D1+D2 is set before and after the preset position Xm to set an AF evaluation value peak detection section. The AF evaluation value peak detection section (p1 through p2) is a section obtained by adding a section in consideration of attitude difference to a section (c1 through c2) determined by D1=distance with the adjacent cam curve×(½).

The D2=(setting distance in consideration of attitude difference) mentioned here is a value which has been set beforehand in consideration of the inclination of the imaging apparatus. For example, this value is set as a value within a range of D2=attitude difference=(¼ through 1)×(depth of field) by employing the depth of field which is an in-focus range existing before and after one focus position (point of focus).

For example, a setting such as D2=0.5×depth of field can be employed. Note that, as described above, in general, the depth of field is deep in a case wherein the optical zoom is at the wide angle side, and is shallow at the telescopic side. Also, the value of the D2 may be set to a different value according to a zoom lens position.

As shown in (a) in FIG. 6, a section where infeed amount is set before and after the AF evaluation value peak detection section (p1 through p2) set by the additional value of the following values D1=(distance between a cam curve where the preset position Xm is set and the adjacent cam curve)×(½), and D2=(setting distance in consideration of attitude difference), as an AF scan range (s1 through s2) for moving the focusing lens. In order to detect the peak of an AF evaluation value, determination has to be performed whether or not the peak is formed, and infeed amount is set for determining transition of the AF evaluation value. The focusing lens is moved within the AF scan range (s1 through s2), detection of the AF evaluation value based on contrast measurement described with reference to FIG. 3 is executed, and in a case wherein the peak of the AF evaluation value is detected, processing for setting the position thereof as a focal point (focus position) is performed.

Description will be made regarding a setting example of the AF scan range (s1 through s2) at the (a) telescopic side (tele end side), with reference to FIG. 7.

The respective points of Xm, c1, c2, s1, and s2 shown in FIG. 7 correspond to the Xm, c1, c2, s1, and s2 shown in (a) in FIG. 6. FIG. 7 illustrates, as an example, a processing example in a case wherein the subject distance selected by the user is 1.0 m.

The Xm shown in FIG. 7 is a focusing lens position set by the focus preset function. That is to say, the Xm is a focusing lens position set as a result of the user estimating distance to a subject, and performing distance selection based on the setting screen described with reference to FIG. 5.

With the focusing lens position (Xm) set by the user as the center, a section (c1 through c2) determined by the D1=distance with the adjacent cam curve×(½) is set before and after the focusing lens position (Xm), a section in consideration of attitude difference is further added thereto to set an AF evaluation value peak detection section (p1 through p2), and further, a section where infeed amount is set as an AF scan range (s1 through s2) is set for moving the focusing lens.

Note that, for example, in a case wherein the focusing lens position (Xm) by the user is set to the cam curve of 0.5 m, and the cam curve of ∞ which is the end portion, shown in FIG. 7, the D1=distance with the adjacent cam curve×(½) is not set in one direction, but in this case, let us say that the same distance as that in the direction where the D1=distance with the adjacent cam curve×(½) is set is set to another direction.

Next, description will be made regarding a processing example in a case wherein the zoom lens is set in the (b) wide angle side (wide end side), with reference to (b) in FIG. 6.

In this case, as shown in (b) in FIG. 6, D2=(setting distance in consideration of attitude difference) is set before and after the Xm to set the AF evaluation value peak detection section (p3 through p4).

This D2=(setting distance in consideration of attitude difference) is a value which has been set beforehand in consideration of the inclination of the imaging apparatus described above. For example, this value is set as a value within a range of D2=attitude difference=(¼ through 1)×(depth of field) by employing the depth of field which is an in-focus range existing before and after one focus position (point of focus).

For example, a setting such as D2=0.5×depth of field can be applied to this value. Note that, as described above, in general, the depth of field is deep in a case wherein the optical zoom is at the wide angle side, and is shallow at the telescopic side. Also, the value of the D2 may be set to a different value according to a zoom lens position.

As shown in (b) in FIG. 6, a section where infeed amount is set is further set before and after the AF evaluation value peak detection section (p3 through p4) set by the D2=(setting distance in consideration of attitude difference) as an AF scan range (s3 through s4) for moving the focusing lens. As described above, in order to detect the peak of an AF evaluation value, determination has to be performed whether or not the peak is formed, and infeed amount is set for determining transition of the AF evaluation value. The focusing lens is moved within the AF scan range (s1 through s2), detection of the AF evaluation value based on contrast measurement described with reference to FIG. 3 is executed, and in a case wherein the peak of the AF evaluation value is detected, processing for setting the position thereof as a focal point (focus position) is performed.

With the above-mentioned embodiment, an arrangement has been described as an example wherein in a case in which the zoom lens is set at the (a) telescopic side (tele end side), the AF evaluation value peak detection section is set, as shown in (a) in FIG. 6, with an additional value of the following values D1=(distance between a cam curve where the preset position Xm is set and the adjacent cam curve)×(½), and D2=(setting distance in consideration of attitude difference), and in a case in which the zoom lens is set in the (b) wide angle side (wide end side), the AF evaluation value peak detection section is set, as described in (b) in FIG. 6, with the following value D2=(setting distance in consideration of attitude difference).

Figure 8:
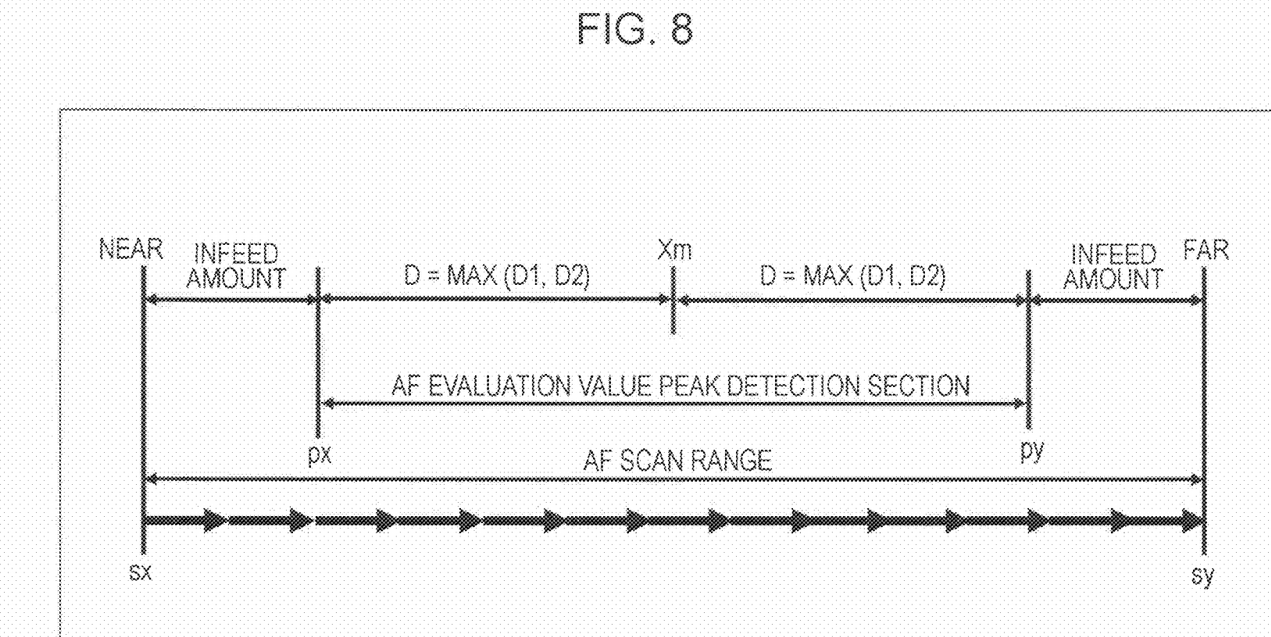
FIG. 8 is a diagram describing a processing example for setting an AF evaluation value peak detection section, and an AF scan range corresponding to a movement range of a focusing lens, according to an embodiment of the present invention.

As another setting example, as shown in FIG. 8, an arrangement may be made wherein the AF evaluation value peak detection section is set as a greater value of the following values D1=(distance between a cam curve where preset position Xm is set and the adjacent cam curve)×(½), and D2=(setting distance in consideration of attitude difference).

That is to say, a greater value (D) of D1=distance to the adjacent cam curve, and D2=attitude difference is obtained as D=Max (D1, D2), this D is set to both sides of the focusing lens position set by the focus preset function to set an AF evaluation value peak detection section (px through py), and further infeed amount is added thereto to set an AF scan range (sx through sy).

Figure 9:
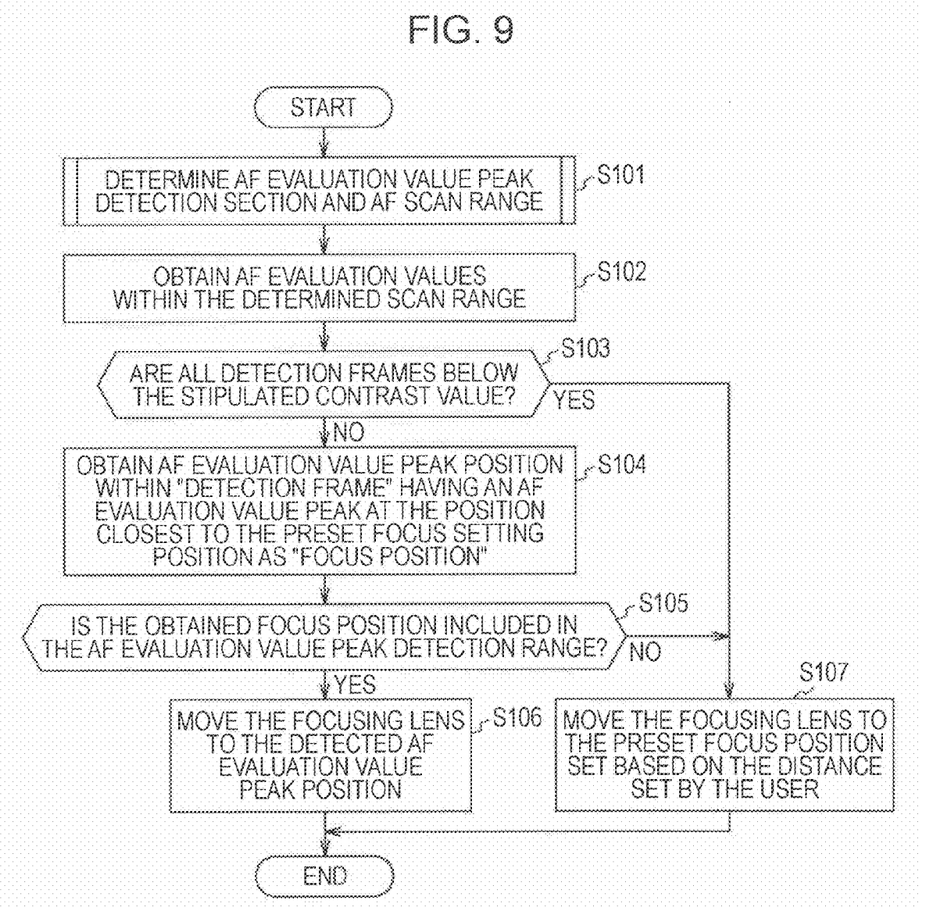
FIG. 9 is a diagram illustrating a flowchart describing an example of processing sequence executed by the imaging apparatus according to an embodiment of the present invention.

Next, description will be made regarding focus control processing sequence executed by the imaging apparatus according to an embodiment of the present invention, with reference to the flowchart shown in FIG. 9. The flow shown in FIG. 9 is executed under the control of the control unit 110 of the imaging apparatus 100 shown in FIG. 2. For example, a focus control program stored in the memory 120 is executed by the control unit 110.

Figure 10:
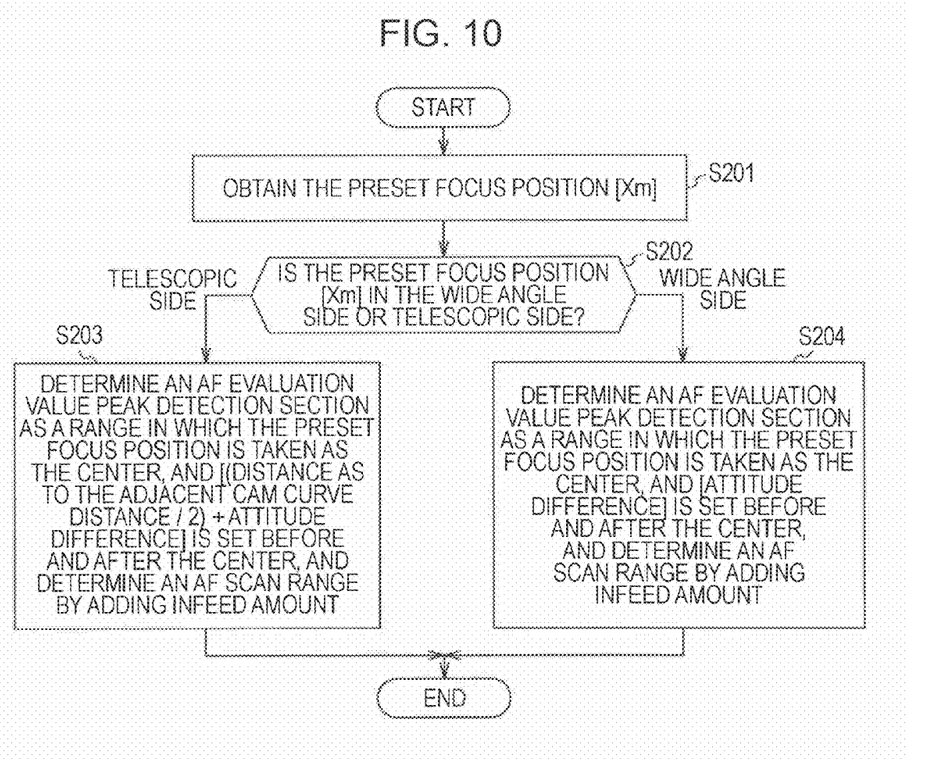
FIG. 10 is a diagram illustrating a flowchart describing an example of processing sequence executed by the imaging apparatus according to an embodiment of the present invention.

First, in step S101, the control unit 110 executes AF evaluation value peak detection section and AF scan range determination processing. The detailed sequence of the processing in step S101 will be described with reference to the flowchart in FIG. 10.

The flow is equivalent to the processing described with reference to FIGS. 6 and 7, and corresponds to an arrangement described as an example wherein in a case in which the zoom lens is set at the (a) telescopic side (tele end side), the AF evaluation value peak detection section is set, as shown in (a) in FIG. 6, with an additional value of the following values D1=(distance between a cam curve where the preset position Xm is set and the adjacent cam curve)×(½), and D2=(setting distance in consideration of attitude difference), and in a case in which the zoom lens is set in the (b) wide angle side (wide end side), the AF evaluation value peak detection section is set, as described in (b) in FIG. 6, with the following value D2=(setting distance in consideration of attitude difference).

First, in step S201, a preset focus position Xm is obtained. The preset focus position Xm is, as described above, a focusing lens position set as a result of the user estimating distance to a subject and performing distance selection based on the setting screen described with reference to FIG. 5, and is a point on the cam curve described with reference to FIG. 4.

Next, in step S202, determination is made whether or not the preset focus position Xm is at the telescopic side (tele end side) or at the wide angle side (wide end side). As described with reference to FIG. 7, the setting position of the zoom lens is divided into two by a predetermined boundary position (Z2), and in a case wherein the zoom lens is set to a position Z1 through Z2 shown in FIG. 7, the (b) wide angle side (wide end side) is determined, and in a case wherein the zoom lens is set to a position Z2 through Z3 shown in FIG. 7, the (a) telescopic side (tele end side) is determined. The boundary position (Z2) is set an appropriate value according to the imaging apparatus, for example, such as a zoom lens position of magnification=three times.

In a case wherein determination is made in step S202 that the preset focus position Xm is at the telescopic side (tele end side), the flow proceeds to step S203. In step S203, as described above with reference to (a) in FIG. 6, an additional value of the following two values D1=(distance between a cam curve where the preset position Xm is set and the adjacent cam curve)×(½), and D2=(setting distance in consideration of attitude difference), i.e., D1+D2 is set before and after the present focus position Xm to set an AF evaluation value peak detection section (p1 through p2). Further, a section where infeed amount is set is set before and after the AF evaluation value peak detection section (p1 through p2) as an AF scan range (s1 through s2) for moving the focusing lens.

On the other hand, in a case wherein determination is made in step S202 that the preset focus position Xm is at the wide angle side (wide end side), the flow proceeds to step S204. In step S204, as described above with reference to (b) in FIG. 6, D2=(setting distance in consideration of attitude difference) is set before and after the preset focus position Xm to set an AF evaluation value peak detection section (p3 through p4). Further, a section where infeed amount is set is set before and after the AF evaluation value peak detection section (p3 through p4) as an AF scan range (s3 through s4) for moving the focusing lens.

According to such processing, the processing in step S101 in the flow in FIG. 9, i.e., the AF evaluation value peak detection section and AF scan range determination processing is completed. Subsequently, in step S102, the focusing lens is moved within the determined AF scan range to detect the peak of an AF evaluation value. This processing is processing for obtaining an AF evaluation value based on contrast described with reference to FIG. 3.

Figure 11:
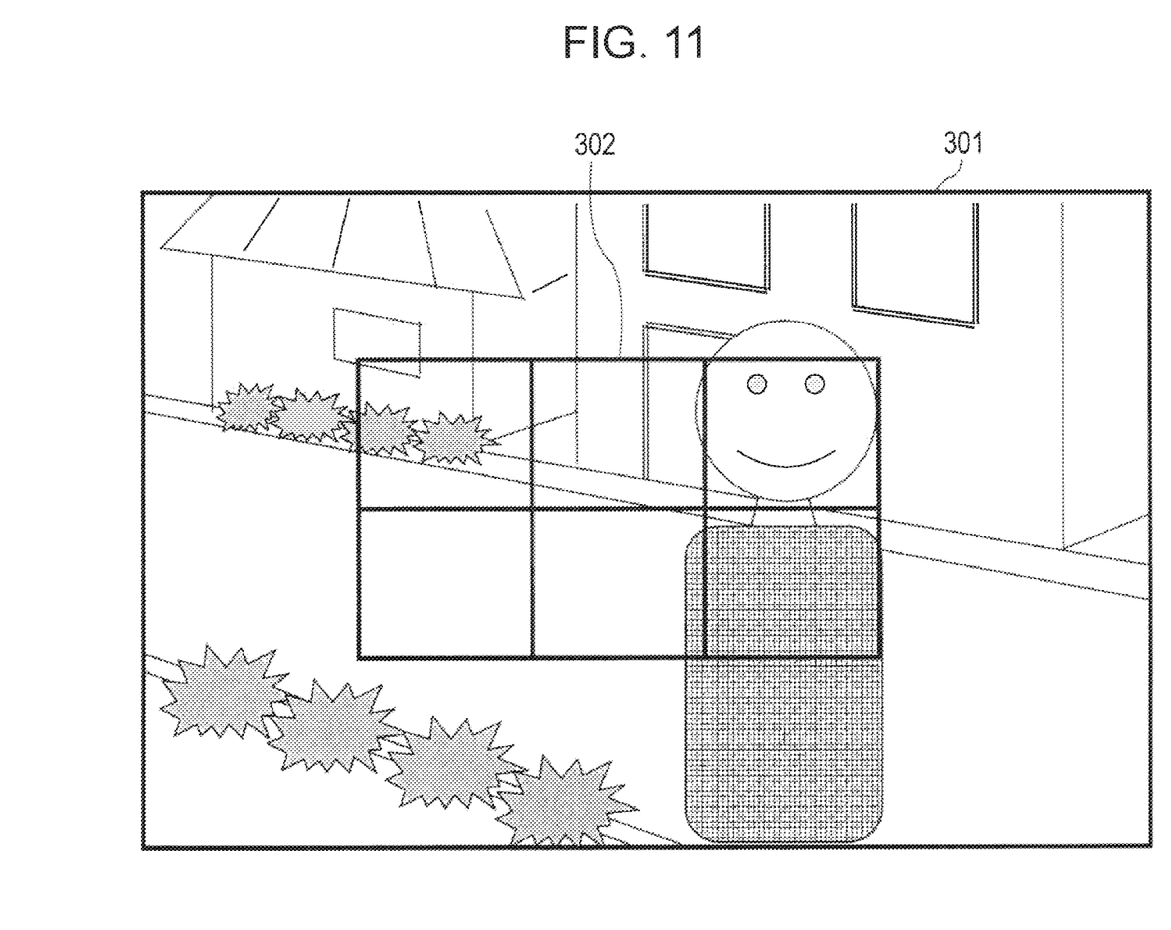
FIG. 11 is a diagram describing a setting example of a detection frame.

Note that obtaining of an AF evaluation value is performed based on contrast within a detection frame set in a part of an image. For example, as shown in FIG. 11, an AF evaluation value based on contrast is obtained regarding each of multiple detection frames 302 set within an image 301.

In step S103, determination is made whether or not the AF evaluation values obtained with all of the detection frames are below a stipulated contrast value set beforehand. In a case wherein the obtained AF evaluation values are below a stipulated contrast value, determination is made that AF evaluation values determined as a focus position have not been obtained, the flow proceeds to step S107, the focusing lens is moved to the preset focus position Xm set based on the distance information set by the user, and the processing ends.

On the other hand, in a case wherein determination is made in step S103 that with the detection frames of which the AF evaluation values have been performed, a detection frame of which the obtained AF evaluation value is not below the stipulated contrast value has been detected, the flow proceeds to step S104.

In step S104, the AF evaluation value peak position of the detection frame having the AF evaluation peak closest to the preset focus setting position Xm is obtained as a focus position. Next, in step S105, determination is made whether or not the obtained focus position is included in the AF evaluation value peak detection range set in step S101. In the case of the obtained focus position being not included, the flow proceeds to step S107, the focusing lens is moved to the preset focus position Xm set based on the distance information set by the user, and the processing ends.

On the other hand, in a case wherein determination is made in step S105 that the obtained focus position is included in the AF evaluation value peak detection range, the flow proceeds to step S106, the focusing lens is moved to the detected AF evaluation value peak position, and the processing ends.

Thus, with the imaging apparatus according to an embodiment of the present invention, different driving ranges of the focusing lens are set for obtaining AF evaluation values in accordance with the zoom position, thereby enabling effective prevention of confusing AF evaluation value peaks being detected together, so the subject which the user intends can be focused on quickly and accurately. Also, restricting the scan range not only realizes fast focusing settings but also enables power consumption in driving the focusing lens to be reduced.

Note that the present invention can be applied to a variety of equipment, such as a digital camera, digital video camera, cell phone with a built-in camera, and so forth.

As described above, description has been made in detail regarding the present invention with reference to the specific embodiments. Note however, it is clearly evident that one skilled in the art can perform various modifications and alternations of the embodiments without departing from the essence of the present invention. That is to say, the present invention has been disclosed exemplarily, and is not to be interpreted restrictively. The Claims should be referred to in order to determine the essence of the present invention.

Also, the series of processing described in the present Specification may be executed by hardware, or software, or a compound arrangement of both. In a case of executing the processing by software, a program in which the processing sequence is recorded may be installed for execution in memory within a computer embedded in dedicated hardware, or the program may be installed for execution in a general-purpose computer which can execute various types of processing. For example, the program may be recorded in a recording medium beforehand. The program may be installed in a computer from the recording medium, and also may be received through a network such as a LAN (Local Area Network) or the Internet, and installed in a recording medium such as a built-in hard disk or the like.

Note that the various types of processing described in the present Specification may be executed not only in time-sequence following the order laid forth but also in parallel or individually according to the processing capabilities of a device for executing the processing or as appropriate. Also, with the present Specification, the term "system" represents a logical group arrangement of multiple devices, which is not restricted to an arrangement wherein the devices each having an individual configuration are housed in the same casing.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
a control unit configured to detect a focus position by moving a focusing lens before and after a preset position which is a focusing lens position set by a focus preset function;
wherein said control unit sets a scan range which is a movement range of said focusing lens that differs according to a setting state of a zoom lens, obtains an autofocus (AF) evaluation value along with movement of said focusing lens within the set scan range, determines a focus position based on the obtained AF evaluation value, and performs processing for setting an AF evaluation value peak detection section, to which a different setting method is applied depending on a zoom lens position.

2. The imaging apparatus according to claim 1, wherein said control unit determines whether the zoom lens position is located at a wide angle side or at a telescopic side, each being sectioned by a predetermined boundary position.

3. The imaging apparatus according to claim 2, wherein in a case in which the zoom lens position is at the telescopic side, said control unit sets an additional value of the following two values
D1=(distance between a cam curve where said preset position is set and an adjacent cam curve)×(½), and
D2=(setting distance in consideration of an attitude difference),
wherein said control unit determines D1+D2 before and after said preset position, Xm, to set said AF evaluation value peak detection section,
and wherein in a case in which the zoom lens position is located at the wide angle side, said control unit determines D2 before and after said preset position Xm, to set said AF evaluation value peak detection section.

4. The imaging apparatus according to claim 3, wherein D2 is a distance within a range bounded by (¼)×(a depth of field) and the depth of field.

5. The imaging apparatus according to claim 1, wherein said control unit sets D, which is a greater value of the following two values,
D1=(distance between a cam curve where said preset position is set and an adjacent cam curve)×(½), and
D2=(setting distance in consideration of an attitude difference),
wherein said control unit sets D=MAX(D1, D2) before and after said preset position, Xm, to set said AF evaluation value peak section.

6. The imaging apparatus according to any of claims 2 through 5, wherein said control unit executes processing for setting a range including an infeed amount set beforehand in said AF evaluation value peak detection section as the scan range which is the movement range of said focusing lens.

7. The imaging apparatus according to claim 1, wherein said control unit calculates said AF evaluation value based on contrast within a detection frame set within an image obtained by said imaging apparatus.

8. An imaging apparatus control method executed by an imaging apparatus, said method comprising:
focus controlling arranged to cause a control unit to detect a focus position by moving a focusing lens before and after a preset position which is a focusing lens position set by a focus preset function;
wherein said focus controlling includes setting a scan range which is a movement range of said focusing lens that differs according to a setting state of a zoom lens, obtaining an autofocus (AF) evaluation value along with movement of said focusing lens within the set scan range, determining a focus position based on the obtained AF evaluation value, and setting an AF evaluation value peak detection section to which a different setting method is applied depending on a zoom lens position.

9. The imaging apparatus control method according to claim 8, wherein said focus controlling further includes:
determining whether the zoom lens position is located at a wide angle side or at a telescopic side, each being sectioned by a predetermined boundary position.

10. The imaging apparatus control method according to claim 9, wherein in a case in which the zoom lens position is at the telescopic side, said control unit sets an additional value of the following two values
D1=(distance between a cam curve where said preset position is set and an adjacent cam curve)×(½), and
D2=(setting distance in consideration of an attitude difference),
wherein said control unit determines D1+D2 before and after said preset position, Xm, to set said AF evaluation value peak detection section;
and wherein in a case in which the zoom lens position is at the wide angle side, said control unit determines D2 before and after said preset position Xm, to set said AF evaluation value peak detection section.

11. The imaging apparatus control method according to claim 10, wherein D2 is a distance within a range bounded by (¼)×(a depth of field) and the depth of field.

12. The imaging apparatus control method according to claim 8, wherein said control unit sets D, which is a greater value of the following two values,
D1=(distance between a cam curve where said preset position is set and an adjacent cam curve)×(½), and
D2=(setting distance in consideration of an attitude difference),
wherein said control unit sets D=MAX(D1, D2) before and after said preset position, Xm, to set said AF evaluation value peak section.

13. The imaging apparatus control method according to any of claims 9 through 12, wherein said focus controlling includes:
wherein said control unit executes processing for setting a range including an infeed amount set beforehand in said AF evaluation value peak detection section as the scan range which is the movement range of said focusing lens.

14. The imaging apparatus control method according to claim 8, wherein said focus controlling includes:
calculating said AF evaluation value based on contrast within a detection frame set within an image obtained by said imaging apparatus.

15. A non-transitory computer readable storage medium having computer readable program codes embodied in the computer readable storage medium that, when executed cause an imaging apparatus to execute:

focus controlling arranged to cause a control unit to detect a focus position by moving a focusing lens before and after a preset position which is a focusing lens position set by a focus preset function;

wherein said focus controlling includes setting a scan range which is a movement range of said focusing lens that differs according to a setting state of a zoom lens, obtaining an autofocus (AF) AF evaluation value along with movement of said focusing lens within the set scan range, determining a focus position based on the obtained AF evaluation value, and setting an AF evaluation value peak detection section to which a different setting method is applied depending on a zoom lens position.

16. The non-transitory computer readable storage medium according to claim 15, wherein said focus controlling further includes:

determining whether the zoom lens position is located at a wide angle side or at a telescopic side, each being sectioned by a predetermined boundary position.

* * * * *